(12) United States Patent
Birkelund et al.

(10) Patent No.: US 7,246,525 B2
(45) Date of Patent: Jul. 24, 2007

(54) SILICON PRESSURE SENSOR WITH DECREASED PRESSURE EQUALIZATION BETWEEN MEASURED PRESSURE AND REFERENCE CHAMBER

(75) Inventors: Karen Birkelund, Koebenhavn Oe (DK); Christoffer Greisen, Valby (DK); Pirmin Rombach, Lyngby (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 10/547,967

(22) PCT Filed: Mar. 9, 2004

(86) PCT No.: PCT/DK2004/000150

§ 371 (c)(1),
(2), (4) Date: Sep. 8, 2005

(87) PCT Pub. No.: WO2004/081510

PCT Pub. Date: Sep. 23, 2004

(65) Prior Publication Data

US 2006/0179951 A1    Aug. 17, 2006

(30) Foreign Application Priority Data

Mar. 10, 2003    (DK) ............................... 2003 00358

(51) Int. Cl.
*G01L 9/06*    (2006.01)
(52) U.S. Cl. ........................................................ 73/716
(58) Field of Classification Search .................. 73/716, 73/736; 257/704
See application file for complete search history.

(56) References Cited

U.S. PATENT DOCUMENTS

| 6,346,742 B1 * | 2/2002 | Bryzek et al. ............... 257/704 |
| 6,363,791 B1 | 4/2002 | Kurosaka et al. .............. 73/724 |
| 2002/0073533 A1 | 6/2002 | Park ............................ 29/613 |

FOREIGN PATENT DOCUMENTS

WO    WO02/29365 A2    4/2002

OTHER PUBLICATIONS

"Selection of glass, anodic bonding conditions and material compatibility for silicon-glass capacitive sensors"; written by T. Rogers et al.; Sensors and Actuators A, 46-47 (1995), pp. 113-120.

* cited by examiner

*Primary Examiner*—Andre J. Allen
(74) *Attorney, Agent, or Firm*—McCormick, Paulding & Huber LLP

(57) ABSTRACT

This invention relates to absolute pressure sensors with two bonded wafers containing a pressure sensing structure and forming a reference pressure chamber and a buffer chamber. Since the buffer chamber collects molecules, which permeate through a bonding interface between the two wafers, a raise in pressure of the reference chamber can be avoided. The sensor is therefore more resistant to pressure equalisation between the pressure chamber and the pressure of the surroundings, i.e. the sensed pressure and repetitive recalibration of the sensor can be avoided.

7 Claims, 2 Drawing Sheets

SILICON PRESSURE SENSOR WITH DECREASED PRESSURE EQUALIZATION BETWEEN MEASURED PRESSURE AND REFERENCE CHAMBER

CROSS REFERENCE TO RELATED APPLICATIONS

This application is entitled to the benefit of and incorporates by reference essential subject matter disclosed in International Patent Application No. PCT/DK2004/000150 filed on Mar. 9, 2004 and Danish Patent Application No. PA 2003 00358 filed Mar. 10, 2003.

FIELD OF THE INVENTION

The invention relates to a pressure sensor and in particular to a sensor comprising first and second wafer components.

BACKGROUND OF THE INVENTION

Absolute sensors made from a laminated structure comprising two wafers, exist. In these sensors, a pressure difference between the ambient sensed pressure and the pressure of a reference pressure chamber deflects a sidewall of the chamber, and the deflection is converted to an electrical signal representing the pressure difference. Often, the reference pressure chamber is evacuated to eliminate thermal effects of residual gases in the chamber.

In order to maintain the given correlation between the read-out from the sensor, it is of importance that the vacuum inside the sealed cavity is maintained. Tests have, however, disclosed that leakage from the ambience into the sealed cavity often takes place no matter how the layers are bonded. Often, leakage occurs as lateral permeation of molecules through the bonded layers.

The lateral permeation of molecules has the effect that pressure inside the sealed cavity will raise from vacuum towards the ambience pressure. The raise in pressure over time causes a pressure equalisation between the sealed cavity and the sensed pressure. This equalization occurs fastest and has the largest impact on sensors for high-pressure applications.

Such silicon sensors are disclosed in "High pressure sensor based on fusion bonding", published in "Proceedings of the Sixth International symposium on Semiconductor Wafer bonding; Science, Technology and Applications in San Francisco, Calif. Sep. 2-7, 2001" (reference 1). An absolute sensor is disclosed in "High-pressure silicon sensor with low-cost packaging", published in "Sensors and Actuators A: Physical 92 (2001) 16-22" (reference 2).

BRIEF SUMMARY OF THE INVENTION

It is an object of this invention to provide an absolute silicon high-pressure sensor, which is more reliable and which requires less recalibration over time. Accordingly, the invention, in a first aspect, provides a sensor wherein a surface structure of at least one of the contact surfaces forms the reference chamber and a buffer chamber when the contact surfaces are bonded together to form said pressure sensor.

Since a buffer chamber is formed in addition to the reference chamber, at least a part of the molecules which permeate through the bonding layer between the wafers may be collected by the buffer chamber. The collected molecules will not contribute to a raise in pressure of the reference chamber, and the buffer chamber thus contributes in making the pressure sensor more resistant against pressure equalisation between the sealed cavity and the sensed pressure and thus contributes in making the sensor more reliable over time.

One or both of the wafers could be made from silicon or glass. The reference chamber and/or the buffer chamber could be made by forming a recess into one of, or both of the contact surfaces before they are bonded together. As an alternative, one or both of the chambers could be formed by making a shift in the level of one of the surfaces, e.g. by placing an electrode on one of the surfaces before they are bonded. Due to inflexibility of the wafers preventing the surfaces to adhere closely across the shift in the level, a gap could be formed between the two wafers in a zone around the shift.

Preferably the buffer chamber forms a channel arrangement which is located between the reference chamber and the first ambient space. It is hereby achieved that lateral permeation of molecules will occur between the ambience pressure and the channel arrangement.

In order to further increase the reliability of the sensor over time, the buffer chamber may be in fluid communication with an opening into a surrounding second ambient space, e.g. being at regular atmospheric pressure. Permeating molecules could thereby flow out of the buffer chamber and into the surrounding atmosphere.

The sensor may comprise a wiring connection area located in a surface which is exposed to pressure of the second ambient space. The opening which establishes communication between the buffer chamber and the second ambient space could be located in the vicinity of the wiring connection.

In a second aspect, the invention provides a method of reducing permeation of molecules between a first ambient space and a reference chamber, the reference chamber being located between components of a pressure sensor. According to this method, a buffer chamber is formed in the pressure sensor between the first ambient space and the reference pressure chamber to collect permeating molecules. The method could be combined with any of the features mentioned in relation to the first aspect of the invention, and in particular, collected molecules could be guided to a second ambient space, e.g. the surrounding atmosphere.

BRIEF DESCRIPTION OF THE DRAWINGS

Now having described the invention in general terms, one embodiment of the invention shall be described in details with reference to the drawing in which.

DETAILED DESCRIPTION OF THE INVENTION

Figure 1:
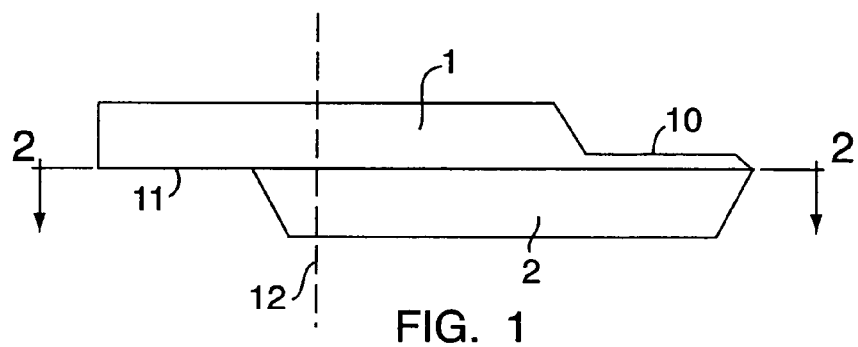
FIG. 1 shows a side-view of a silicon pressure sensor.
Figure 2:
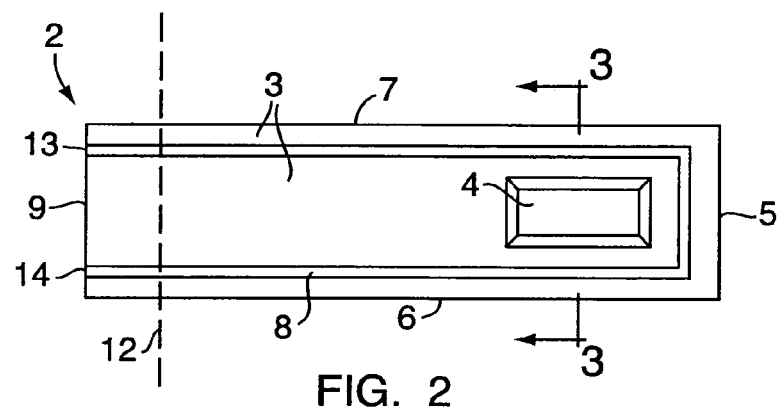
FIG. 2, shows a top-view of the bond area of a standard wafer.

FIG. 1 shows a side view of a silicon pressure sensor consisting of a first wafer 1 and a second wafer 2. In the second wafer, as shown in FIG. 2, a surface structure forms a buffer chamber 8 and a reference chamber 4 when wafers are bonded together. The first wafer 1 is a component wafer, specifically a SOI (Silicon On Isolator) wafer, on which the sensing structure is placed in the form of at least one piezo-resistor, and typically, in form of a network of piezo-resistive components. The general aspects of the first wafer 1 could be found in references 1 and 2.

The second wafer 2 is a standard wafer, and it is made from a material which is selected based on the media in which the pressure is sensed. It could simply be a glass wafer.

A first surface portion forms a sensing area 10 of the sensor. This surface is exposed to pressure of a first ambient space existing on the right side of the dotted line 12, i.e. the pressure which is sensed relative to the pressure of the reference pressure chamber. A second surface portion 11 is exposed to pressure of a second ambient space existing on the left side of the dotted line 12, e.g. the surrounding atmospheric pressure. An area for wiring connection is located in the second surface portion. The dotted line 12 indicates a boundary, e.g. a wall of a pressure chamber separating the first ambient space from the second ambient space. Normally, the sensor would be fitted with fittings facilitating hermetic attachment to such a boundary. The fittings could comprise external sealing means to prevent fluid communication between the two spaces. As shown in further details in FIG. 5, the sealing could e.g. comprise a screw threaded portion of the outer surface, and a gasket, e.g. an O-ring, to enable sealing engagement between the sensor and a wall of a pressure system.

Line 2-2 in FIG. 1 indicates the section wherein the two wafers are bonded, and FIG. 2 shows a cross-sectional view along this bonding line, seen from above, i.e. a top view of the second wafer 2. As shown in FIG. 2 the second wafer 2 has a recess forming the reference chamber 4 near the end 5 of the wafer. When the wafers are bonded, the reference chamber 4 is placed underneath the sensing area 10 which is formed in the first wafer 1, c.f. FIG. 1.

FIG. 2 further shows the buffer chamber in the form of a channel arrangement 8, running as a U-shape from a first end portion 9 along a side portion 7, along a second end portion 5, along the side portion 6 and back to the first end portion 9. The channel arrangement is thus located between the reference chamber and the first ambient space, and molecules which permeate through the bonding between the wafers are therefore collected by the buffer chamber.

Since the channel arrangement 9 has two openings 13, 14 which are located on the left side of the dotted boundary-indicating line 12, the permeating molecules can be released into the second ambient space. Openings into the second ambient space prevent the pressure in the buffer chamber to rise. The openings are, however, optional.

Figure 3:
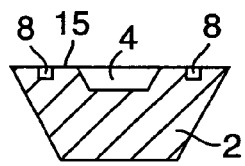
FIG. 3 shows a cross sectional view of the standard wafer.

FIG. 3 shows a sectional view of section line 3-3 in FIG. 2 and clearly shows that the reference pressure chamber 4 and the buffer chamber 8 are made as recesses into the bonding surface 15 of the second wafer 2.

Figure 4:
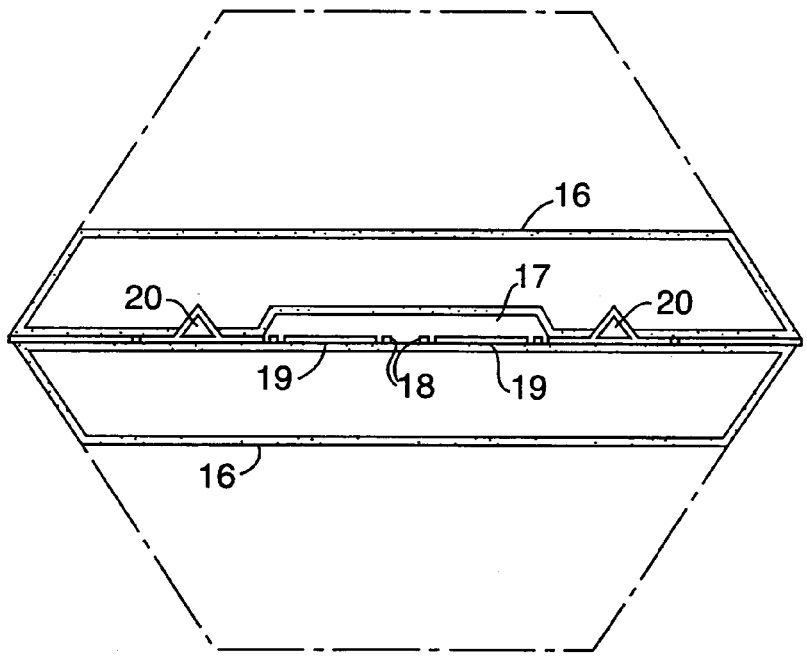
FIG. 4 shows a more detailed cross sectional view of the sensor.

FIG. 4 shows a more detailed cross sectional view of the sensor. The outer line 16 indicates a protective coating e.g. made of quarts. The reference cavity 17 contains piezo-resistors 18 and interconnections 19 for electrical connectivity between the resistors and conditioning electronics located outside the sensor. The buffer chamber 20 is located between the ambient space and the reference chamber.

Figure 5:
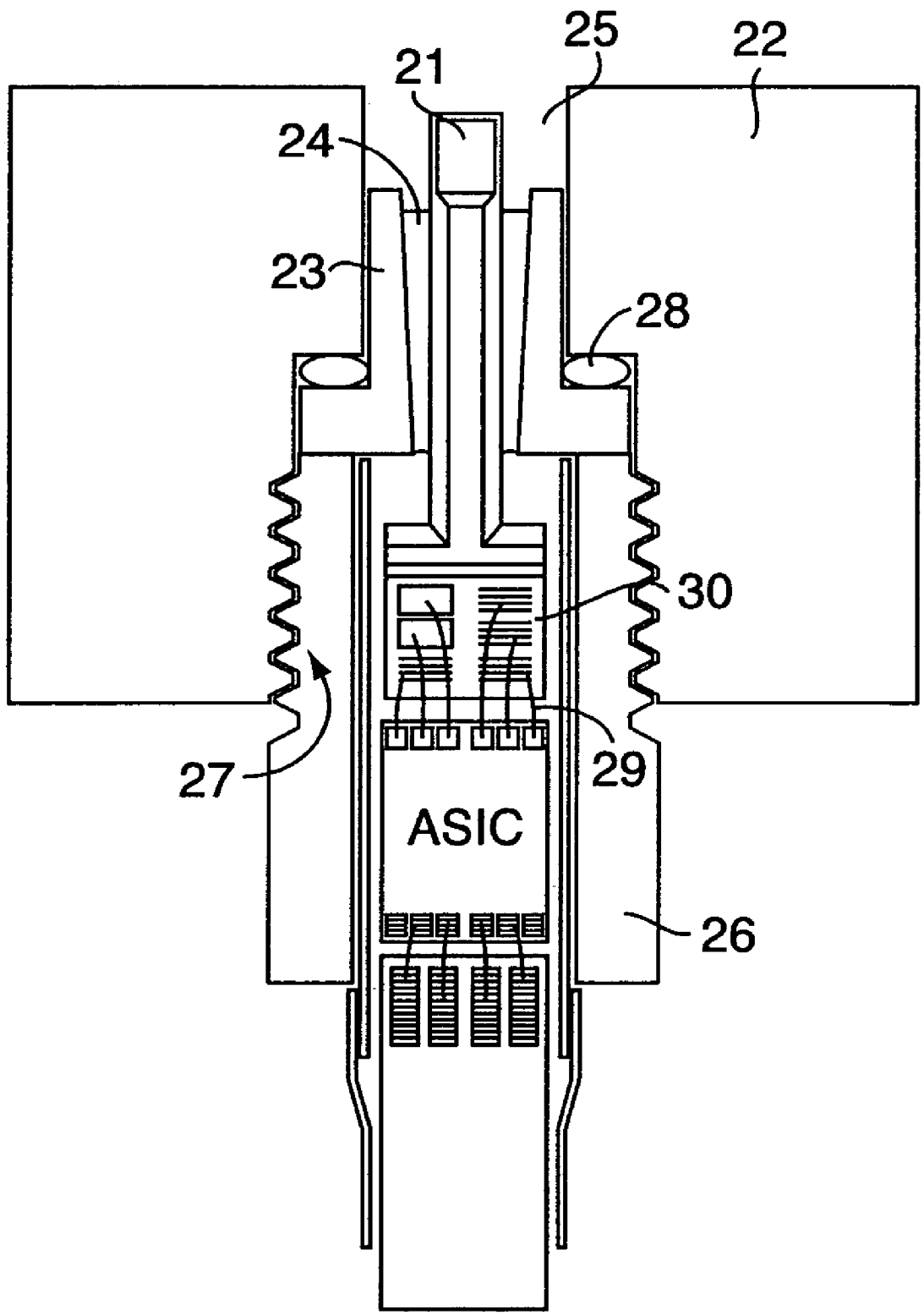
FIG. 5 shows a sensor including sealing means for inserting the sensor into a pressurised system.

FIG. 5 shows a sensor in a complete assembly. The sensor 21 is fastened hermetically to a wall 22 of a pressure system via a sleeve 23. The sleeve and the sensor are moulded into contact via glass frit 24, and the sleeve is pushed into the opening 25 of the wall by a bush 26. The bush comprises a screw threaded part 27 and the O-ring 28 provides hermetic sealing. Inside the bush, wires 29 are connected to a surface 30 of the sensor, which surface also comprises an opening into the buffer chamber of the sensor.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A pressure sensor comprising first and second wafer components, one of which comprises at least one piezo-resistive component for sensing a difference between pressure of a first ambient space and pressure of a reference chamber, said two wafers having contact surfaces, wherein a surface structure of at least one of the contact surfaces forms the reference chamber and a buffer chamber when the contact surfaces are bonded together to form said pressure sensor, and wherein the buffer chamber forms a channel arrangement located between the reference chamber and the first ambient space, the buffer chamber being designed to collect molecules permeating between said first ambient space and said reference chamber.

2. A pressure sensor according to claim 1, wherein the surface structure comprises a recess forming at least one of the chambers between the wafers when the wafers are bonded together.

3. A pressure sensor according to claim 1, further comprising attachment means for attaching the sensor to a boundary between the first ambient space and a second ambient space, the attachment means dividing an outer surface of the sensor into a first surface portion exposed to pressure of the first ambient space and a second surface portion exposed to pressure of the second ambient space, wherein the buffer chamber is in fluid communication with an opening in the second surface portion to equalize pressure differences between the buffer chamber and the second ambient space.

4. A pressure sensor according to claim 1, wherein the piezo-resistive component is electrically connected to a wiring connection area located in the second surface portion.

5. A pressure sensor according to claim 4, wherein the first wafer is made from silicon and the second wafer is made from a material selected from the group consisting of glass and silicon.

6. A method of reducing permeation of molecules between a first ambient space and a reference chamber located between components of a pressure sensor configured to sense a difference between pressure of the first ambient space and the reference chamber, method comprising:

forming a buffer chamber in the pressure sensor between the first ambient space and the reference pressure chamber to coiled permeating molecules.

7. A method according to claim 6, further comprising:

collected molecules to a second ambient space.

* * * * *

UNITED STATES PATENT AND TRADEMARK OFFICE
CERTIFICATE OF CORRECTION

| | |
|---|---|
| PATENT NO. | : 7,246,525 B2 |
| APPLICATION NO. | : 10/547967 |
| DATED | : July 24, 2007 |
| INVENTOR(S) | : Karen Birkelund et al. |

It is certified that error appears in the above-identified patent and that said Letters Patent is hereby corrected as shown below:

Column 4, Claim 6, Line 59, please delete the word "coiled" and replace it with the word --collect--.
Column 4, Claim 7, Line 61, please add the word --guiding-- after the word "comprising"

Signed and Sealed this

Twentieth Day of November, 2007

JON W. DUDAS
*Director of the United States Patent and Trademark Office*